A. B. Clemons.

Clutch Pulley.

No. 3,713. Reissued Nov. 9, 1869.

Witnesses
Henry G. Alling
W. Bristol

Inventor
Andrew B. Clemons

United States Patent Office.

ANDREW B. CLEMONS, OF ANSONIA, CONNECTICUT.

*Letters Patent No.* 84,681, *dated December* 8, 1868; *reissue No.* 3,713, *dated November* 9, 1869.

IMPROVEMENT IN FRICTION-CLUTCH PULLEY.

The Schedule referred to in these Letters Patent and making part of the same.

*To all whom it may concern:*

Be it known that I, ANDREW B. CLEMONS, of Ansonia, in the county of New Haven, and State of Connecticut, have invented a new Improvement in Friction-Clutch Pulley; and I do hereby declare the following, when taken in connection with the accompanying drawings, and the letters of reference maked thereon, to be a full, clear, and exact description of the same, and which said drawings constitute part of this specification, and represent, in—

Figure 1:
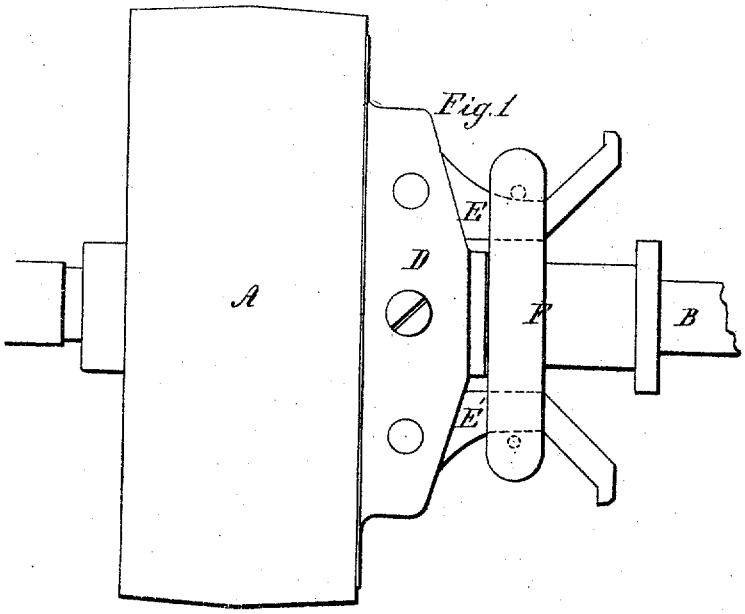

Figure 1, a side view of my improved pulley, and in

Figure 2:
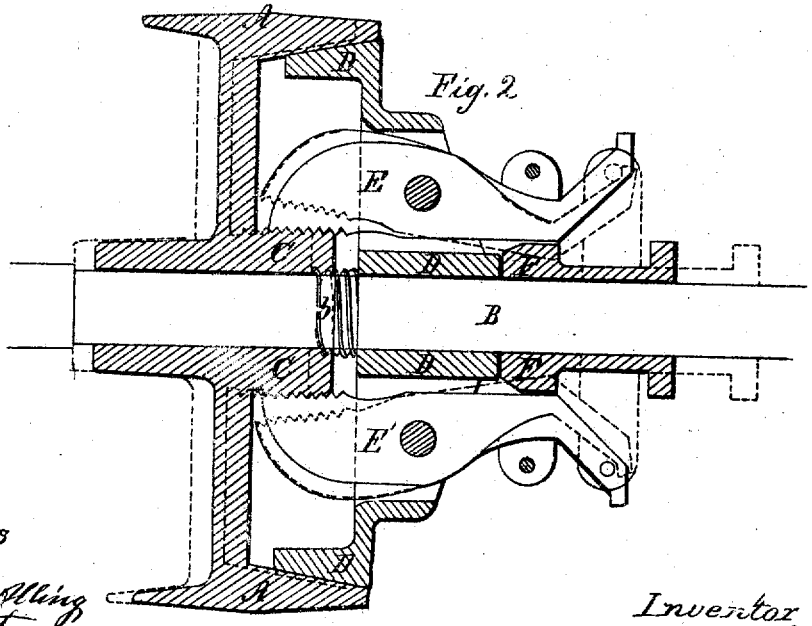

Figure 2, a longitudinal central section of the same.

This improvement relates to an improvement in friction-clutch pulleys, that is, pulleys to which power is coupled by an inclined frictional surface, working in or on to a corresponding inclined surface on the pulley, so that one revolving, the other is caused to revolve by the friction created between the said inclined surfaces; and The invention consists in the arrangement, on one part, of a lever, one end of which is formed with a screw-thread, and operating so as to work into a corresponding screw-thread on the other part, and so that when the said lever is turned, to bring its thread into the threads of the other part, the one part revolving, will draw the other part toward it, or itself toward the other part.

In the drawings, I have represented the pulley as arranged so as to slide freely on the shaft axially, and the other part or friction-plate fixed to the shaft, so as to revolve with it, and I will thus describe it.

A is the pulley, revolving loosely upon the shaft B, furnished with a hub, C, upon which a screw-thread is cut.

Fastened upon the said shaft B, and revolving with it, is placed the friction-plate or clutch D. The incline upon its face is fitted to a corresponding incline in the pulley A.

Held in, and extending through this friction-plate, in which they form bearings, are two levers, E and E', made similar to each other in form, the jaws of both of which are provided with a screw-thread, to correspond with the similar thread upon the hub of the pulley.

These jaws are operated, that is, opened and closed upon the hub, by means of a slide, F, which moves freely upon the shaft, and is connected with the shipper.

The portion of the said slide nearest to and around the shaft, is constructed with an incline, to act upon the levers when they are open, and force the said levers out, and close the jaws upon the hub, as shown in fig. 2.

Upon this said slide, further from the shaft, and over the levers, pins *a a* are placed. The object of these pins is to act upon the upper inclined side of the lever, as the slide F is carried back by the shipper, and force open the jaws, as shown in broken lines, fig. 2.

*b* is a spiral spring, placed upon the shaft, between the friction-plate and the hub of the pulley, to carry the said pulley back, when released by the jaw, to the position shown in broken lines, fig. 2.

This completes the construction of my improvement.

The operation is as follows:

When the shaft is in operation, the friction-plate and the pulley A are drawn together, in the position shown in figs. 1 and 2.

If it is desired to stop the motion of the shaft, the slide F is thrown back by means of the shipper, in which operation the pins strike the inclines on the levers, and throw them down, which movement opens the jaws or threaded ends of the said levers, and releases them from the thread upon the hub C, as shown in broken lines.

The spring *b*, acting upon the hub of the pulley, immediately presses it away from the friction-plate, and carries the said pulley back, until it strikes the shoulder upon the shaft, as shown in fig. 2.

If desired to bring the shaft into operation, the slide F is thrown forward. The incline thereon strikes the arms of the levers, forcing them outward, and consequently pressing the jaws down upon the hub C. The pulley itself is held firm by the belt, so that it does not revolve with the shaft, but so soon as the friction-plate, revolving with the shaft, draws the pulley, by means of the thread, on to the friction-plate, so far that the friction between the two is greater than the power required to turn the pulley, the pulley will turn with the clutch and shaft, until released by the opening of the levers and jaws.

It will be obvious that one lever only will accomplish the object, yet I prefer two or more; and it will be further obvious that if what is here represented as the pulley be arranged upon the shaft, so as to have no movement axially, (as must be the case if it be a gear,) the clutch-plate must be arranged, so as to be drawn toward the pulley, that is, the clutch-plate must slide axially on the shaft, but so as to turn with the shaft.

While I have represented the levers as fixed to the friction-plate, to those familiar with this class of machinery, it will be evident that the levers may, if preferred, be hung in the pulley or other part A, and the threaded hub formed in the friction-plate, and also that the operation of the levers may be caused by a direct connection, as a link, to the slide F, instead of the incline on the slide and incline on the lever.

I claim, as my invention—

1. The two parts A and D of a friction-clutch, combined with one or more threaded levers E, hung in one part, and a corresponding threaded hub on the other part, so that by the revolution of one of the parts, the two may be drawn together, substantially in the manner set forth.

2. In combination with the subject-matter of the first clause of claim, the slide F, arranged so that, by its axial movement on the shaft, the levers may be operated, to cause the two parts of the clutch to run together, substantially as set forth.

ANDREW B. CLEMONS.

Witnesses:

FRANKLIN FAND,

D. K. LEACH.